United States Patent
Huang et al.

(10) Patent No.: US 7,657,087 B2
(45) Date of Patent: Feb. 2, 2010

(54) METHOD AND COMPUTER-READABLE MEDIUM FOR DETECTING FLESH-TONE PIXELS

(75) Inventors: Ling-Shiou Huang, Tainan (TW); Hung-Shih Lin, Tainan (TW)

(73) Assignee: Himax Technologies, Inc. (TW)

( * ) Notice: Subject to any disclaimer, the term of this patent is extended or adjusted under 35 U.S.C. 154(b) by 773 days.

(21) Appl. No.: 11/406,072

(22) Filed: Apr. 18, 2006

(65) Prior Publication Data

US 2007/0242874 A1    Oct. 18, 2007

(51) Int. Cl.
*G06K 9/34* (2006.01)
(52) U.S. Cl. .................. 382/164; 382/162; 382/165; 382/167; 382/173; 382/181
(58) Field of Classification Search .............. 382/162, 382/164, 165, 167, 173, 181
See application file for complete search history.

(56) References Cited

U.S. PATENT DOCUMENTS 5,130,935 A * 7/1992 Takiguchi ................ 382/167
5,412,487 A * 5/1995 Nishimura et al. .......... 358/452

* cited by examiner

*Primary Examiner*—Vikkram Bali
*Assistant Examiner*—Daniel Zeilberger
(74) *Attorney, Agent, or Firm*—Baker & McKenzie LLP

(57) ABSTRACT

This invention provides a method and computer-readable medium for detecting flesh-tone regions in pictures, images, and videos. First, a flesh-tone axis is defined in a color space coordinate system, the flesh-tone axis passing through both the center of a flesh-tone region and the origin of the color space coordinate system. A perpendicular point, is then calculated on the flesh-tone axis as being the point having the shortest distance to an input pixel. A first distance and a second distance are then calculated based on the coordinates of the input pixel, the perpendicular point and the center of the flesh-tone region. The determination as to whether the input pixel is in the flesh-tone region can be made based on the first distance and second distance.

19 Claims, 3 Drawing Sheets

METHOD AND COMPUTER-READABLE MEDIUM FOR DETECTING FLESH-TONE PIXELS

BACKGROUND OF THE INVENTION

1. Field of the Invention

This invention generally relates to the field of video processing, and, in particular, certain embodiments relate to a method and computer-readable medium for detecting flesh-tone pixels in pictures, images, and videos.

2. Description of the Prior Art

There are two common methods for detecting flesh-tone pixels in pictures, images, and videos. According to a first method, described for example in the YCbCr domain, if the Cb value of a pixel is between threshold_1 and threshold_2 (i.e., threshold_1<Cb<threshold_2), and the Cr value of the pixel is between threshold_3 and threshold_4 (i.e., threshold_3<Cr<threshold_4), the pixel is determined to be a flesh-tone, wherein the thresholds are predetermined by a user. However, since this method defines a rectangular region in the color space rather than an oval-shaped region, non-flesh-tone pixels can be included. Thus, this method may not accurately distinguish between flesh-tone pixels and non-flesh-tone pixels.

According to another method of detecting flesh-tone pixels in the YIQ domain, if the I value of a pixel is between threshold_5 and threshold_6 (i.e., threshold_5<I<threshold_6), and the Q value of the pixel is between threshold_7 and threshold_8 (i.e., threshold_7<Q<threshold_8), the pixel is determined to be a flesh-tone, wherein the thresholds are predetermined by a user. However, two color space conversions, such as from YCbCr to YIQ and from YIQ back to YCbCr, are required for this method, one before the determining process and one afterwards. Thus, this method complicates the procedure by adding two color space conversion operations.

Thus, the well known methods for detecting flesh-tone pixels are either inaccurate or too complicated. In view of the drawbacks mentioned above, there is a need for a new and improved method for detecting flesh-tone pixels.

SUMMARY OF THE INVENTION

In accordance with certain embodiments of the present invention, a system and method for detecting flesh-tone pixels substantially obviates one or more of the problems, limitations and disadvantages of the prior art mentioned in the background.

According to certain embodiments of the present invention, a method for detecting flesh-tone pixels in pictures, images, and videos includes (a) defining a flesh-tone axis in a color space coordinate system, wherein the flesh-tone axis passes through both the center of a flesh-tone region and the origin of the color space coordinate system; (b) calculating a perpendicular point, wherein the perpendicular point is the point on the flesh-tone axis having the shortest distance to an input pixel; (c) calculating a first distance and a second distance based on the coordinates of the input pixel, the perpendicular point and the center of the flesh-tone region; and (d) determining whether the input pixel is in the flesh-tone region based on the first distance and the second distance.

According to certain embodiments of the present invention, a system for detecting flesh-tone pixels in pictures, images, and videos comprises a computer-readable medium encoded with computer program code for performing a method including (a) defining a flesh-tone axis in a color space coordinate system, wherein the flesh-tone axis passes through the center of a flesh-tone region and the origin of the color space coordinate system; (b) calculating a perpendicular point, wherein the perpendicular point is the point on the flesh-tone axis having the shortest distance to an input pixel; (c) calculating a first vertical distance between the input pixel and the perpendicular point and a second vertical distance between the perpendicular point and the center of the flesh-tone region; and (d) determining whether the input pixel is in the flesh-tone region based on the first distance and the second distance.

BRIEF DESCRIPTION OF THE DRAWINGS

The accompanying drawings incorporated in and forming a part of the specification illustrate certain embodiments of the present invention, and together with the description serve to explain the principles of the disclosure. In the drawings.

DETAILED DESCRIPTION OF THE PREFERRED EMBODIMENTS

Those of skill in the art will appreciate that the present invention can be practiced in a wide range of other embodiments besides those explicitly described herein.

Figure 1:
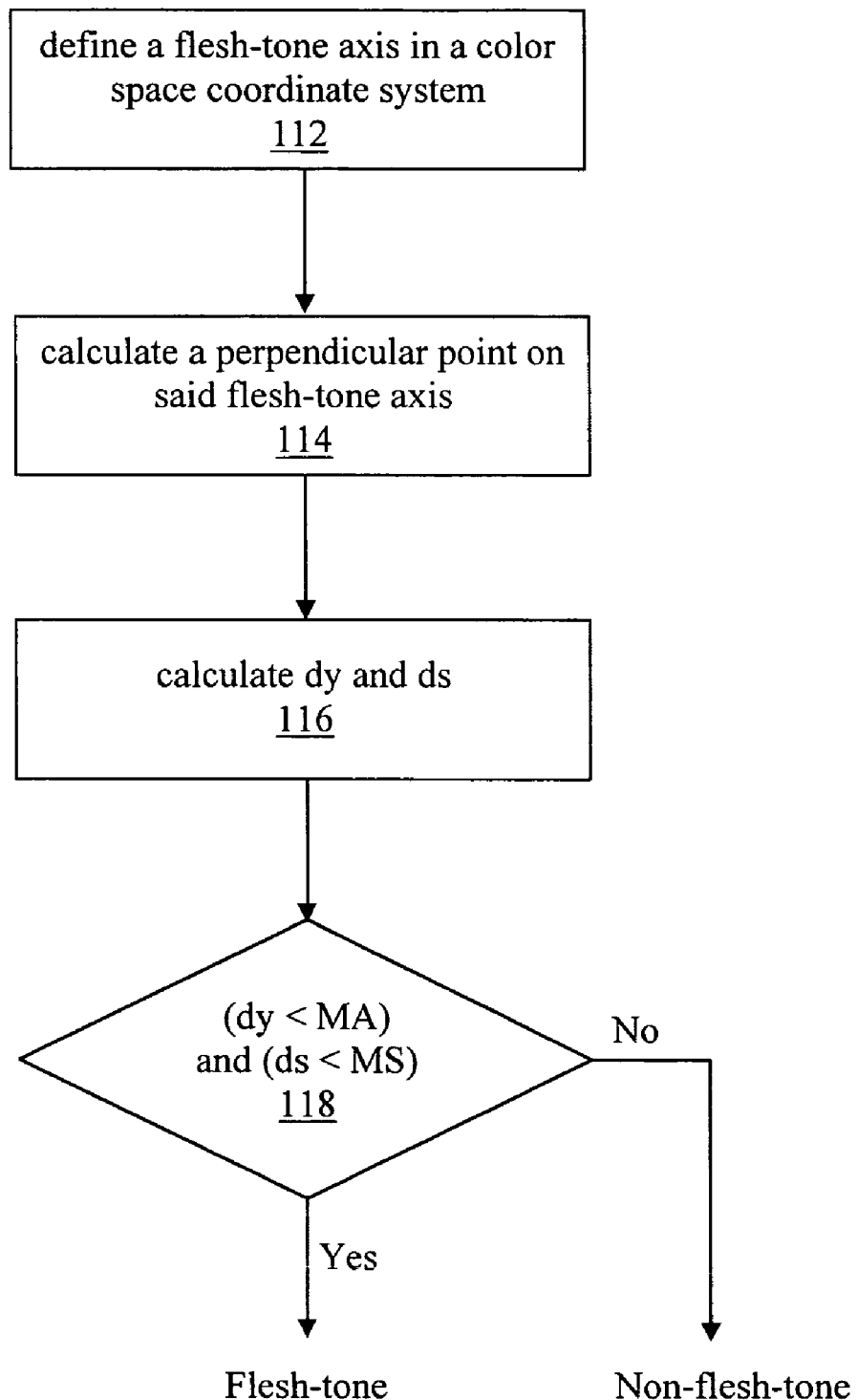
FIG. 1 illustrates a flowchart according to certain embodiments of the present invention.

First referring to FIG. 1, a flowchart according to certain embodiments of the present invention is illustrated. In step 112, a flesh-tone axis is defined in a color space coordinate system, wherein the flesh-tone axis passes through both the center of a flesh-tone region and the origin of the color space coordinate system. In other words, the flesh-tone axis is defined by the center (C) of the flesh-tone region and the origin (O) of the color space coordinate system. In this embodiment, the color space coordinate system could be any color space coordinate system, such as YCbCr, YIQ, YUV, etc. The center of the flesh-tone region is predetermined based on the color of skin of ethnic groups, that is, the center of the flesh-tone region changes according to the particular ethnic group selected. In step 114, a perpendicular point on the flesh-tone axis that has the shortest distance to an input pixel is determined. The coordinates (Xp, Yp) of the perpendicular point (P) can be determined by the following calculations:

$$Xp = (Yi + (cof1 * Xi)) * cof3 \text{ and } Yp = cof2 * (Yi + (cof1 * Xi)) * cof3,$$

where (Xp, Yp) represents the position of the perpendicular point (P), (Xi, Yi) represents the position of the input pixel (I), and $$cof1 = Xc/Yc,$$

$$cof2 = Yc/Xc, \text{ and}$$

$$cof3 = 1/(cof1 + cof2),$$

where (Xc, Yc) represents the position of the center (C) of the flesh-tone region.

In step 116, a first distance (dy) and a second distance (ds) are calculated. The first distance (dy) is the absolute value of the distance between the input pixel (I) and the perpendicular point (P) projected onto the vertical axis (i.e., the vertical distance). In other words, the first distance (dy) can be represented by dy=|Yi-Yp|, where Yi and Yp represent the Y-axis values of the input pixel (I) and the perpendicular point (P), respectively. The second distance (ds) is the absolute value of the distance between the perpendicular point (P) and the center (C) of the flesh-tone region projected on the vertical axis (i.e., the vertical distance). In other words, the second distance (ds) can be represented by ds=|Yp-Yc|, where Yp and Yc represent the Y-axis values of the perpendicular point (P) and the center (C) of the fleshton region, respectively.

In step 118, it is determined whether the input pixel is in the flesh-tone region. In the present embodiment, the first distance (dy) and the second distance (ds) are compared to a first threshold (MA) and a second threshold (MS), respectively. If the first distance (dy) is smaller than the first threshold (MA) and the second distance (ds) is smaller than the second threshold (MS), then the input pixel is in the flesh-tone region, that is, the input pixel is a flesh-tone pixel. Otherwise, the input pixel is a non-flesh-tone pixel. The first threshold (MA) and the second threshold (MS) are two predetermined values. The first threshold (MA) is proportional to the acute angle between the flesh-tone axis and the horizontal axis (X-axis) of the color space coordinate system, or the maximum angle of the flesh-tone region. The second threshold (MS) is proportional to the area of the flesh-tone region, or the maximum saturation of the flesh-tone region. The first threshold (MA) and the second threshold (MS) can each be scaled to a value between 1 and 64. Accordingly, whether each input pixel is in the flesh-tone region can be determined by steps 112, 114, 116, and 118.

Figure 2:
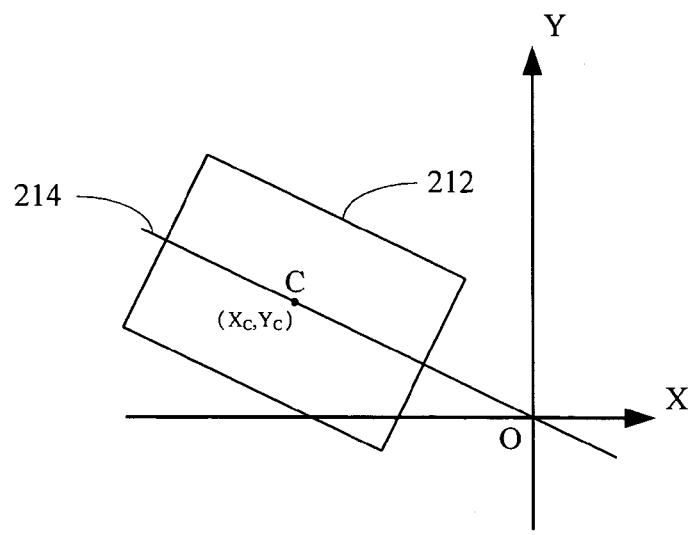
FIG. 2 illustrates a step of defining a flesh-tone axis in a color space coordinate system according to certain embodiments of the present invention.

Referring to FIG. 2, a flesh-tone axis 214 is defined in a color space coordinate system in accordance with one embodiment of step 112 of FIG. 1. The flesh-tone axis 214 passes through the center C(Xc,Yc) of a flesh-tone region 212 and the origin (O) of the color space coordinate system. In other words, the flesh-tone axis 214 is defined by the center C(Xc, Yc) of the flesh-tone region 212 and the origin (O) of the color space coordinate system. The center C(Xc, Yc) of the flesh-tone region 212 is set in advance based on the color of skin of different ethnic groups. Also, any color space coordinate system can be used, such as YCbCr, YIQ, YUV, etc. For example, if the color space coordinate system is YCbCr then the X-axis would represent Cb values and the Y-axis would represent Cr values.

Figure 3:
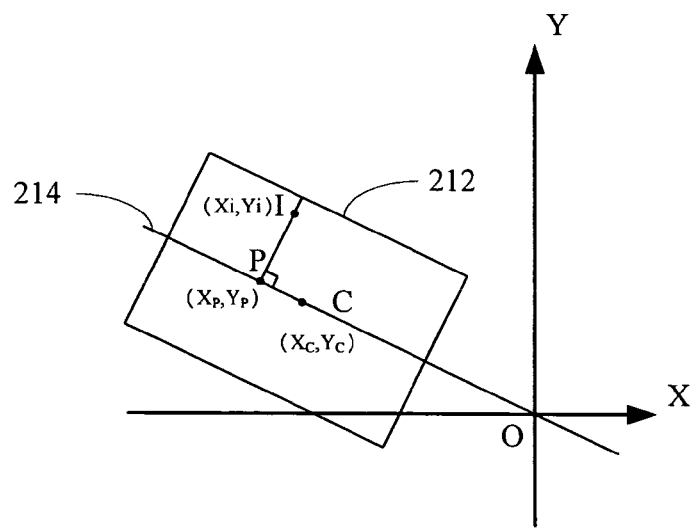
FIG. 3 illustrates a step of finding a perpendicular point on the flesh-tone axis of FIG. 2, according to certain embodiments of the present invention.

Referring to FIG. 3, a step of finding a perpendicular point P(Xp, Yp) on the flesh-tone axis 214 in accordance with one embodiment of step 114 of FIG. 1 is illustrated, wherein the perpendicular point P(Xp, Yp) is the point along the flesh-tone axis having the shortest distance to an input pixel I(Xi, Yi). The perpendicular point P(Xp, Yp) can be determined from the following calculations:

$$Xp=(Yi+(cof1*Xi))*cof3 \text{ and } Yp=cof2*(Yi+(cof1*Xi))*cof3,$$

where cof1=Xc/Yc, cof2=Yc/Xc, and cof3=1/(cof1+cof2).

Figure 4:
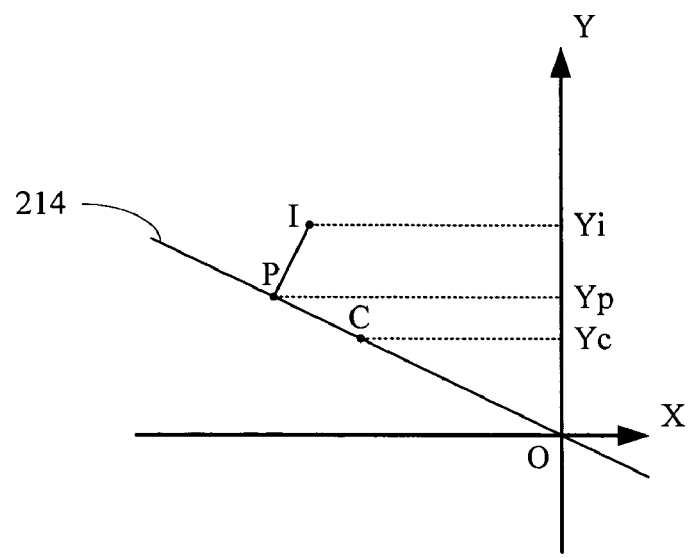
FIG. 4 illustrates a step of calculating a first distance and a second distance on the vertical axis of the color space coordinate system of FIG. 2 according to certain embodiments of the present invention.

Referring to FIG. 4, a step of calculating a first distance dy and the second distance ds in accordance with one embodiment of step 116 of FIG. 1 is illustrated. The first distance dy is the vertical distance between the input pixel I(Xi, Yi) and the perpendicular point P(Xp, Yp), which can be calculated as dy=|Yi-Yp|. Accordingly, the first distance can be associated with a color difference between the input pixel I(Xi, Yi) and the perpendicular point P(Xp, Yp) taken along the Y-axis. The second distance ds is the vertical distance between the perpendicular point P(Xp, Yp) and the center C(Xc, Yc) of the flesh-tone region 212, which can be calculated as ds=|Yp-Yc|. Accordingly, the second distance can be associated with a color difference between the perpendicular point P(Xp, Yp) and the center C(Xc, Yc) taken along the Y-axis. According to one embodiment of step 118 of FIG. 1, the input pixel I(Xi, Yi) is in the flesh-tone region 212 if the first distance dy is smaller than the first threshold MA and the second distance ds is smaller than the second threshold MS, otherwise the input pixel I(Xi, Yi) is not in the flesh-tone region 212, wherein the first threshold MA and the second threshold MS are predetermined values as previously described.

Figure 5:
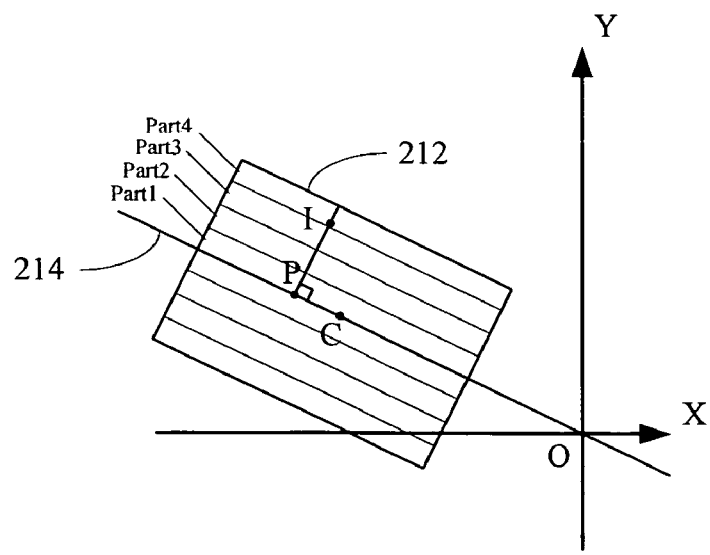
FIG. 5 illustrates a step of determining how close the input pixel is to the flesh-tone axis according to certain embodiments of the present invention.

Referring to FIG. 5, a step for determining how close the input pixel I(Xi, Yi) is to the flesh-tone axis is illustrated according to one embodiment of the present invention. A flesh-tone region 212 can be divided into 2N parts (where N is an integer greater than or equal to 2). It is then determined which part of the flesh-tone region 212 the input pixel I(Xi, Yi) is located in. This is determined by performing the series of comparisons:

$$((N-a)/N)*MA > dy \geq ((N-b)/N)*MA,$$

for the values a=0 to (N−1) and b=1 to N, (where a and b are integers). MA represents the first threshold.

For example, when N is 4, the flesh-tone region 212 is divided into 8 parts. Accordingly, if ds is smaller than MS and dy is between (¼)*MA and 0 (i.e., (¼)*MA>dy≧0), then the input pixel I(Xi, Yi) is in Part 1 of the flesh-tone region as illustrated in FIG. 5. For another example, if ds is smaller than MS and dy is between (2/4)*MA and (¼)*MA (i.e., (2/4)*MA>dy≧(¼)*MA), then the input pixel I(Xi, Yi) is in Part 2 of the flesh-tone region as illustrated in FIG. 5. For another example, if ds is smaller than MS and dy is between (¾)*MA and (2/4)*MA (i.e., (¾)*MA>dy≧(2/4)*MA), then the input pixel I(Xi, Yi) is in Part 3 of the flesh-tone region as illustrated in FIG. 5. For another example, if ds is smaller than MS and dy is between MA and (¾)*MA (i.e., MA>dy≧(¾)*MA), then the input pixel I(Xi, Yi) is in Part 4 of the flesh-tone region as illustrated in FIG. 5. It can thus be determined how close the input pixel I(Xi, Yi) is to the flesh-tone axis 214, since Part I is closer to the flesh-tone axis 214 than Part 2, Part 2 is closer than Part 3, and Part 3 is closer than Part 4.

According to certain embodiments of the present invention, a system for detecting flesh-tone pixels comprises a computer-readable medium containing program code for performing the steps 112, 114, 116, 118 of FIGS. 1-5 described above.

Although specific embodiments have been illustrated and described, it will be apparent to those skilled in the art that various modifications may be made without departing from the present invention.

What is claimed is:

1. A method implemented in a computing device for determining whether an input pixel in a color space coordinate system is a flesh-tone pixel, wherein said method when executed by the computing device, causes the computing device to perform a plurality of steps comprising:

(a) defining a flesh-tone axis in said color space coordinate system, wherein said color space coordinate system includes an origin, a first coordinate axis and a second coordinate axis, and said flesh-tone axis passes through a center of a flesh-tone region and the origin of said color space coordinate system;

(b) calculating a perpendicular point on said flesh-tone axis, said perpendicular point having the shortest distance to an input pixel;

(c) calculating a first distance between said input pixel and said perpendicular point projected on the first coordinate axis, and a second distance between said perpendicular point and the center of said flesh-tone region projected on the first coordinate axis; and (d) determining that said input pixel is a flesh-tone pixel if said first distance is smaller than a first threshold value and said second distance is smaller than a second threshold value, wherein said first threshold value is proportional to an acute angle between said flesh-tone axis and the second coordinate axis, and said second threshold value is proportional to an area of said flesh-tone region.

2. The method according to claim 1, wherein step (b) further comprises calculating the position of said perpendicular point as:

$$Xp=(Yi+(cof1*Xi))*cof3 \text{ and } Yp=cof2*(Yi+(cof1*Xi))*cof3,$$

wherein (Xp, Yp) represents the position of said perpendicular point, (Xi, Yi) represents the position of said input pixel, and cof1=Xc/Yc, cof2=Yc/Xc, and cof3=1/(cof1cof2), where (Xc,Yc) represents the position of the center of said flesh-tone region.

3. The method according to claim 1, wherein step (c) further comprises calculating said first distance as:

$$dy=|Yi-Yp|,$$

wherein dy represents said first distance, Yi and Yp respectively represent coordinate values of said input pixel and said perpendicular point, on the first coordinate axis.

4. The method according to claim 1, wherein step (c) further comprises calculating said second distance as:

$$ds=|Yp-Yc|,$$

wherein ds represents said second distance, and Yp and Yc respectively represent coordinate values of said perpendicular point and the center of said flesh-tone region, on the first coordinate axis.

5. The method according to claim 3, wherein step (d) further comprises:

dividing said flesh-tone region into 2N parts, wherein N is an integer greater than or equal to 2; and determining which part of said flesh-tone region said input pixel is located in, based on the following plurality of comparisons:

$$((N-a)/N)*MA > dy \geq ((N-b)/N)*MA,$$

for the values a=0 to (N−1) and b=1 to N, wherein a and b are integers, and MA represents said first threshold value.

6. The method according to claim 1, wherein said color space coordinate system is selected from a group consisting of YCbCr, YIQ and YUV.

7. A computer-readable medium containing a program code for detecting flesh-tone pixels, the program code causing a computer to execute a method comprising:

(a) defining a flesh-tone axis in a color space coordinate system, wherein said color space coordinate system includes an origin, a first coordinate axis and a second coordinate axis, and said flesh-tone axis passes through a center of a flesh-tone region and the origin of said color space coordinate system;

(b) calculating a perpendicular point on said flesh-tone axis, said perpendicular point having the shortest distance to an input pixel;

(c) calculating a first distance between said input pixel and said perpendicular point projected on the first coordinate axis, and calculating a second distance between said perpendicular point and the center of said flesh-tone region projected on the first coordinate axis; and (d) determining whether said first distance is smaller than a first threshold value and said second distance is smaller than a second threshold value, wherein said first threshold value is proportional to an acute angle between said flesh-tone axis and the second coordinate axis, and said second threshold value is proportional to an area of said flesh-tone region.

8. The computer-readable medium according to claim 7, wherein step (b) further comprises calculating the position of said perpendicular point as:

$$Xp=(Yi+(cof1*Xi))*cof3 \text{ and } Yp=cof2*(Yi+(cof1*Xi))*cof3,$$

wherein (Xp, Yp) represents the position of said perpendicular point, (Xi, Yi) represents the position of said input pixel in said color space coordinate system, and cof1=Xc/Yc, cof2=Yc/Xc, and cof3=1/(cof1+cof2), wherein (Xc,Yc) represents the position of the center of said flesh-tone region in said color space coordinate system.

9. The computer-readable medium according to claim 7, wherein step (c) further comprises calculating said first distance as:

$$dy=|Yi-Yp|,$$

wherein dy represents said first distance, and Yi and Yp respectively represent coordinate values of said input pixel and said perpendicular point on the first coordinate axis.

10. The computer-readable medium according to claim 7, wherein step (c) further comprises calculating said second distance as:

$$ds=|Yp-Yc|,$$

wherein ds represents said second distance, and Yp and Yc respectively represent coordinate values of said perpendicular point and the center of said flesh-tone region on the first coordinate axis.

11. The computer-readable medium according to claim 9, wherein step (d) further comprises:

dividing said flesh-tone region into 2N parts, wherein N is an integer greater than or equal to 2; and determining which part of said flesh-tone region said input pixel is located in, based on the following plurality of comparisons:

$$((N-a)/N)*MA > dy \geq ((N-b)/N)*MA,$$

for the values a=0 to (N−1) and b=1 to N, wherein a and b are integers, and MA represents said first threshold value.

12. The computer-readable medium according to claim 7, wherein said color space coordinate system is selected from a group consisting of YCbCr, YIQ and YUV.

13. A method implemented in a computing device for determining whether an input pixel in a color space coordinate system is a flesh-tone pixel, wherein said method when executed by the computing device, causes the computing device to perform a plurality of steps comprising:

(a) defining a flesh-tone axis in said color space coordinate system, wherein said color space coordinate system includes an origin, a first coordinate axis and a second coordinate axis, and said flesh-tone axis passes through a center of a flesh-tone region and the origin of said color space coordinate system;

(b) calculating coordinate values of a perpendicular point that is a perpendicular projection of the input pixel on said flesh-tone axis;

(c) calculating a first color difference between said input pixel and said perpendicular point, and a second color difference between said perpendicular point and the center of said flesh-tone region; and (d) determining whether said input pixel is a flesh-tone pixel based on the first and second color difference.

14. The method according to claim 13, wherein the first color difference is taken between projections of said input pixel and said perpendicular point on the first coordinate axis, and the second color difference is taken between projections of said perpendicular point and the center of said flesh-tone region on the first coordinate axis.

15. The method according to claim 13, farther comprising determining whether said first color difference is smaller than a first threshold value and whether said second color difference is smaller than a second threshold value.

16. The method according to claim 15, wherein said first threshold value is proportional to an acute angle between said flesh-tone axis and the second coordinate axis, and wherein said second threshold value is proportional to a measurement of the area covered by said flesh-tone region.

17. The method according to claim 13, wherein step (b) further comprises calculating the position of said perpendicular point as:

$$Xp=(Yi+(cof1*Xi))*cof3 \text{ and } Yp=cof2*(Yi+(cof1*Xi))*cof3,$$

wherein (Xp, Yp) represents the position of said perpendicular point, (Xi, Yi) represents the position of said input pixel, and $cof1=Xc/Yc$, $cof2=Yc/Xc$, and $cof3=1/(cof1+cof2)$, wherein (Xc, Yc) represents the position of the center of said flesh-tone region.

18. The method according to claim 14, wherein step (c) further comprises calculating the first color difference according to the formula:

$$dy=|Yi-Yp|,$$

wherein dy represents said first color difference, and Yi and Yp respectively represent coordinate values of said input pixel and said perpendicular point on the first coordinate axis.

19. The method according to claim 14, wherein step (c) further comprises calculating the second color difference according to the formula:

$$ds=|Yp-Yc|,$$

wherein ds represents said second color difference, and Yp and Yc respectively represent coordinate values of said perpendicular point and the center of said flesh-tone region on the first coordinate axis.

* * * * *

UNITED STATES PATENT AND TRADEMARK OFFICE
CERTIFICATE OF CORRECTION

| | | |
|---|---|---|
| PATENT NO. | : 7,657,087 B2 | Page 1 of 1 |
| APPLICATION NO. | : 11/406072 | |
| DATED | : February 2, 2010 | |
| INVENTOR(S) | : Huang et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 960 days.

Signed and Sealed this

Twenty-eighth Day of December, 2010

David J. Kappos
*Director of the United States Patent and Trademark Office*